United States Patent [19]

Franzke et al.

[11] Patent Number: 5,562,569

[45] Date of Patent: Oct. 8, 1996

[54] METHOD OF GEAR DETECTION FOR CONTROLLING DRIVE TORQUE

[75] Inventors: Knut Franzke, Oberriexingen; Oliver Joachim, Ditzingen, both of Germany

[73] Assignee: Robert Bosch GmbH, Stuttgart, Germany

[21] Appl. No.: 316,895

[22] Filed: Oct. 3, 1994

[30] Foreign Application Priority Data

Oct. 4, 1993 [DE] Germany ............................ 43 33 822.4

[51] Int. Cl.$^6$ ................ G01D 1/16; G01P 3/00; B60K 28/16
[52] U.S. Cl. .................. 477/110; 477/111; 364/426.01
[58] Field of Search ..................... 477/97, 110, 111; 364/426.01, 424.01, 426.02

[56] References Cited

U.S. PATENT DOCUMENTS

| | | | |
|---|---|---|---|
| 4,680,988 | 7/1987 | Mori ........................... | 477/110 X |
| 5,016,175 | 5/1991 | Baltusis et al. .................. | 477/129 X |
| 5,072,631 | 12/1991 | Fujimoto et al. ................ | 477/111 |
| 5,103,398 | 4/1992 | Akiyama ........................ | 477/129 X |
| 5,103,928 | 4/1992 | Danner et al. ................... | 364/426.01 X |
| 5,325,740 | 7/1994 | Zhang et al. .................... | 477/110 |
| 5,333,108 | 7/1994 | Hessmert et al. ................. | 364/426.02 X |

FOREIGN PATENT DOCUMENTS

| | | |
|---|---|---|
| 0406712 | 1/1991 | European Pat. Off. . |
| 2134659 | 8/1984 | United Kingdom . |

*Primary Examiner*—Khoi Q. Ta
*Attorney, Agent, or Firm*—Felfe & Lynch

[57] ABSTRACT

The invention is based on a motor vehicle having a drive unit (101) and a transmission (103) which is operatively connected to the drive unit by way of a converter unit (102) and which automatically changes its step-ups, whereby at least two wheels (104) of the motor vehicle are driven. For the purpose of gear detection in accordance with the invention, the mean velocity (Vrad) or the mean rotational speed of the driven wheels is detected and/or ascertained, and the output rotational speed N(Nmot) of the drive unit is detected. Furthermore, a variable (Nmot/Vrad), representing the ratio of the output rotational speed of the drive unit to the mean wheel velocity or the mean wheel rotational speed, is formed. This variable is then compared with at least two threshold values ((Sup, Sdown), wherein change-up or change-down operations of the transmission are inferred from the comparison result. With knowledge of change-up or change-down operations, the step-up of the transmission (Gi) actually set may then be inferred on the basis of the step-up set before the comparison.

9 Claims, 6 Drawing Sheets

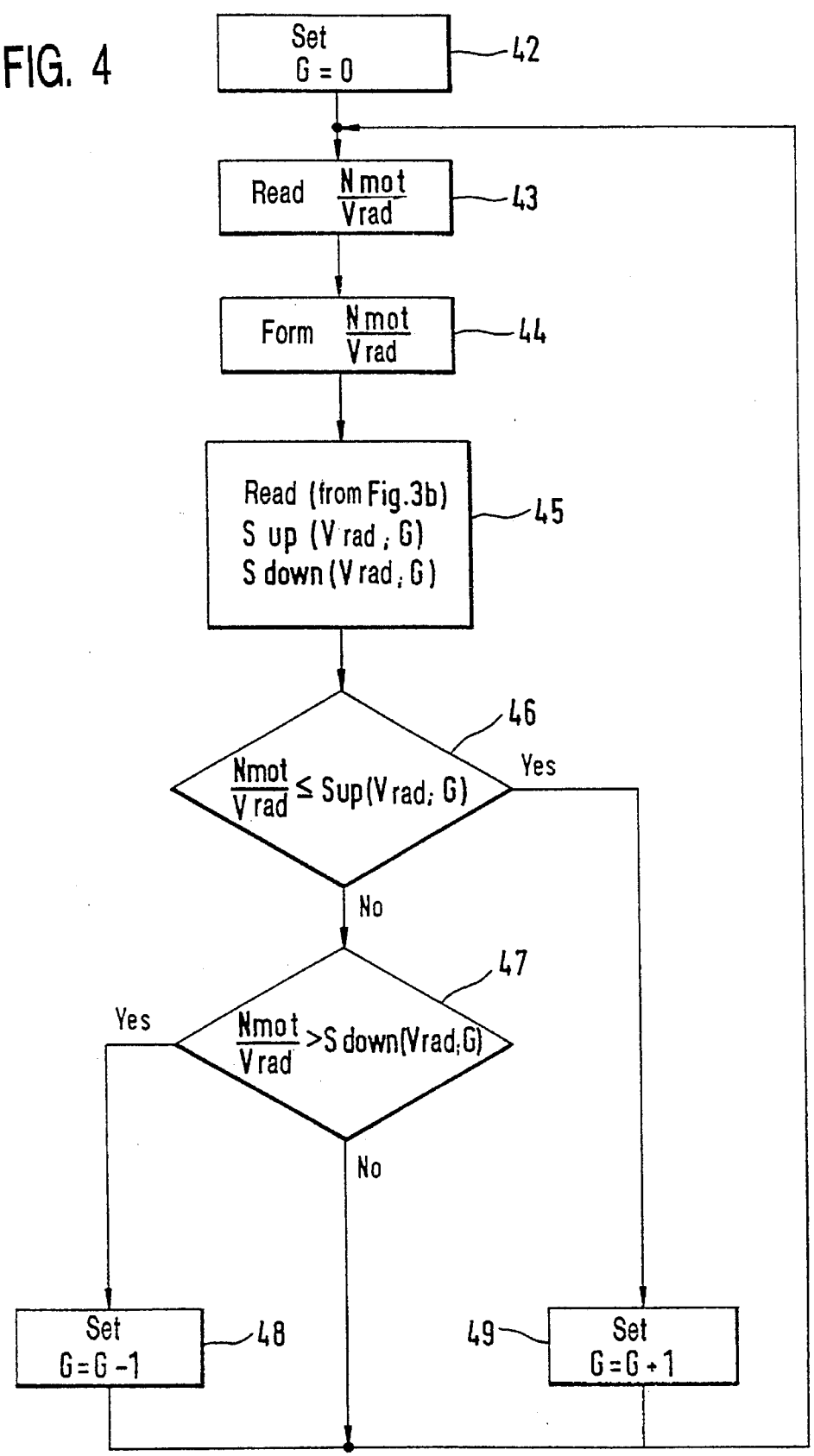

METHOD OF GEAR DETECTION FOR CONTROLLING DRIVE TORQUE

PRIOR ART

The invention relates to a method of, and a device for, gear stage detection in a motor vehicle.

Motor vehicles are generally equipped with a transmission disposed between the drive unit (engine) and the driven wheels. A transmission of this kind has a plurality of step-up stages. Knowledge of the step-up of the transmission engaged at any given time is required an an input variable for many regulating and/or control systems of the motor vehicle.

A drive-slip control (ASR) may be mentioned as such a regulating or control system. A drive-slip control (ASR) of this kind is known in many embodiments from the prior art as an important possibility of optimizing the travelling behavior. Spinning of the drive wheels of a motor vehicle as the result of excess torque is regulated or controlled by regulation of the slip. The basic idea of ASR is based on the fact that a spinning wheel, like a locking wheel, cannot transmit any lateral guidance forces, whereby a spinning wheel leads to losses of stability, particularly in a rear-wheel-driven vehicle. In the case of drive-slip regulation, it is advantageous to know the torque amplification between the engine and the drive wheels for the purpose of calculating the forces or torques at the drive wheels. The wheel torque, which is proportional to the wheel force or the wheel slip, may thereby be ascertained and influenced independently of the engaged gear stage of the transmission.

In PCT/EP 89/00798 designating the United States (WO 90/02057), incorporated herein by reference, the determined gear stage is used to calculate a desired engine torque in order to influence the engine torque (and therefore the wheel torque) by adjusting the throttle or the fuel metering.

In PCT/DE 93/00956 designating the United States (WO 94/10013, U.S. Ser. No. 08/256,188), incorporated herein by reference the determined gear stage $i_{ges}$ is used to calculate a drive torque $M_A$. The drive torque $M_A$ is used to determine a maximum braking torque $M_{br}$, which in turn is used to limit brake pressure or increase the drive torque. The dependence of the drive torque on the gear stage assures that the wheel torque is independent of the engaged gear stage of the transmission.

In motor vehicles having a manually-shifted transmission, the gear stage Gi engaged may be ascertained from the signals of the mean drive wheel velocity Vrad and of the engine speed Nmot. In this connection, as may be seen as the prior art in FIG. 2, the quotient Nmot/Vrad is formed and the actual gear stage G engaged is ascertained by comparison with the limiting thresholds Sij applying to the individual gear stages Gi and Gj. The limiting thresholds Sij are at the same time applied in such a way that oscillations of the above-mentioned quotient, caused by vibrations in the drive train, are tolerated. The actual mechanical step-ups of the transmission including the differential step-up, are then associated with the individual gear stages G. The wheel torque or the wheel force or the wheel slip may thereby be detected and influenced.

In vehicles having a automatic transmission, the coupling between the engines and the drive wheels is determined by a torque converter in addition to a mechanical transmission stage. This converter on the one hand compensates for the differences between the rotational speeds of the engine and the transmission input upon the automatic change of gear and, on the other hand, it amplifies the engine torque in front of the transmission input in dependence upon its input-output rotational speed ratio. Since the ratio of the mean drive wheel velocity and the engine speed may, theoretically, assume any optional value in the case of an automatic transmission having a torque converter, the above-mentioned methods of determining the instantaneous transmission step-up are ruled out.

In transmission systems having an electronic transmission control, such as are known from, for example, "Bosch, Technical Reports, Volume 7 (1983), Issue 4, pages 160 to 166", the information on the actually set step-up of the transmission may be fed to the ASR control unit by way of an electronic interface between the electronic transmission control unit and the ASR control unit. However, this method is expensive due to the interface required.

The object of the invention is to simplify the detection of the gear stage engaged.

SUMMARY OF THE INVENTION

The invention is based on a motor vehicle having a drive unit and a transmission which automatically changes its step-ups and which is operatively connected to the drive unit by way of a converter unit, whereby at least two wheels of the motor vehicle are driven. To recognise the gear in the manner in accordance with the invention, the mean velocity or the mean rotational speed of the driven wheels is detected and/or determined, and the Output rotational speed of the drive unit is detected. Furthermore, a variable, representing the ratio of the output rotational speed of the drive unit to the mean wheel velocity or the mean wheel rotational speed, is formed. This variable is then compared with, at least two threshold values, wherein change-up or change-down operations of the transmission are inferred from the comparison result. Based on the step-up set before the comparison, and with knowledge of change-up or change-down operations, the step-up of the transmission actually set may be inferred.

Since the mean velocity or the mean rotational speed of the driven wheels and the output rotational speed of the drive unit is required for drive slip control, these signals generally exist in the control unit controlling the-drive slip of the vehicle. This eliminates the above-mentioned interface between the ASR control unit and the electronic transmission control.

Thus, in accordance with the invention, and contrary to the prior art (FIG. 2), a fixed limiting quotient for the ratio of the engine speed to the mean wheel velocity is not used for each gear stage of the automatic transmission, and a limiting quotient, in each case dependent upon the drive wheel velocity and the actual gear stage, is formed for the purpose of change-up and change-down.

It is particularly advantageous that the threshold values are dependent upon the step-up set before the comparison.

Furthermore, based on the step-up set before the comparison, the next shorter step-up is detected as instantaneous step-up when one threshold value is passed in a negative direction, and the next longer step-up is detected as instantaneous step-up when the other threshold value is exceeded.

After a change-up or change-down operation has been detected, the actual gear stage before this detection is advantageously actualized.

In order, within the scope of the the drive slip control, to influence the drive torques acting upon the wheels, it is necessary to know these torques as accurately as possible. In this connection, the torque amplification of the converter has to be ascertained in addition to the actual amplification of the torque by the transmission which is specified by the actual gear.

Therefore, it is particularly advantageous to ascertain the converter amplification with the use of the method of gear detection in accordance with the invention. This is effected by detecting and/or ascertaining the mean velocity or the mean rotational speed of the driven wheels. Furthermore, the output rotational speed of the drive unit is detected and, in conjunction with the gear actually engaged and ascertained in accordance with the invention, and the mean velocity or the mean rotational speed of the driven wheels, the actual converter amplification is inferred.

It is advantageous that the output rotational speed of the converter is inferred on the basis of the mean velocity or the mean rotational speed of the driven wheels and the gear actually engaged, and the actual converter amplification is ascertained from the ratio of the output rotational speed of the drive unit to the output rotational speed of the converter.

As already mentioned, the method in accordance with the invention is used particularly for drive slip control ASR.

Furthermore, a device for performing the method in accordance with the invention is a subject of the invention.

BRIEF DESCRIPTION OF THE DRAWINGS

FIGS. 4 and 5 are each a flow diagram.

DETAILED DESCRIPTION OF THE PREFERRED EMBODIMENT

Figure 1:
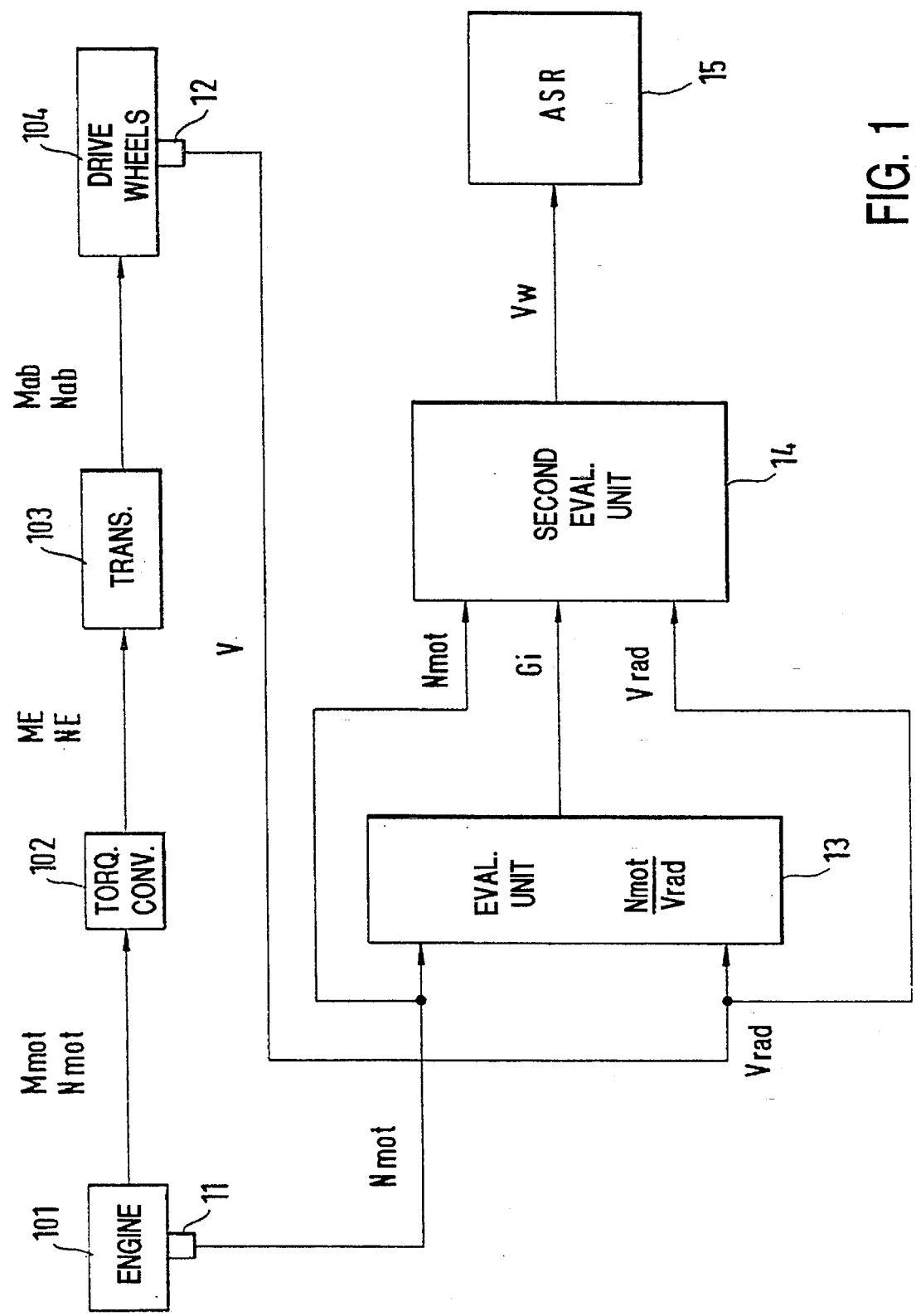
FIG. 1 is a block circuit diagram of the invention.

FIG. 1 is a block circuit diagram, wherein a drive unit 101 (engine) transmits an engine speed Nmot and an engine torque Mmot to the converter unit 102. The transmission input rotational speed NE and the transmission input torque ME are applied to the transmission 103 from the output of the converter unit 102. The transmission output rotational speed Nab or the transmission output torque Mab which drives the drive wheels of the vehicle 104 will be seen at the output of the transmission 103. The sensors 11 and 12 detect, on the one hand, the engine speed Nmot or the mean wheel velocity Vrad. These two variables are fed to the evaluation unit 13. The mode of operation of the evaluation unit 13 will be described with reference to FIG. 4. The signal Gi lies at the output of the evaluation unit 13 and represents the step-up of the transmission 103 actually set. If the engine speed Nmot and the mean wheel velocity Vrad are fed to a second evaluation unit 14 in addition to the signal Gi, the signal $V_W$ representing the instantaneous torque amplification of the converter lies at the output and is fed to the ASR control 15. The mode of operation of the second evaluation unit 14 will be seen from FIG. 5.

Figure 2:
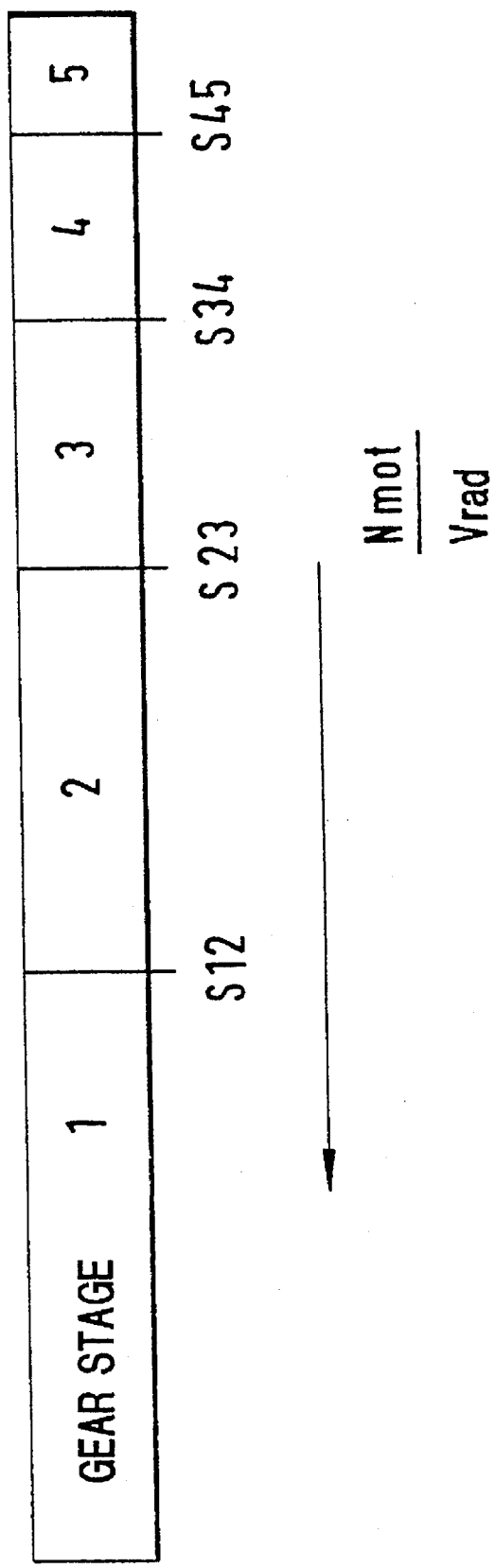
FIG. 2 shows the method in a manually-shifted transmission in accordance with the prior art.

FIG. 2, already described in the evaluation of the prior art, shows the method of ascertaining the gear of a manually-shifted transmission. Here, the gear stage engaged is ascertained from the signals of the mean drive wheel velocity Vrad and the engine speed Nmot by forming the quotient Nmot/Vrad. The engaged gear stage of the transmission may be clearly ascertained from the quotient at any given time by comparison with limiting thresholds Sij applying to the individual gear stages. As has already been mentioned, in vehicles having an automatic transmission, the coupling between the engine 101 and the drive wheels 104 is also determined by a torque converter 102 in addition to a mechanical transmission stage 103. As already mentioned, the converter 102 on the one hand compensates for the differences between the engine speed Nmot and the transmission input rotational speed NE upon automatic gear shift and, on the other hand, it amplifies the engine torque Mmot to the transmission input torque ME in dependence upon the rotational speed ratio NE/Nmot.

Since the ratio Nmot/NE, and thus also the quotient Nmot/Vrad, may, theoretically, assume any optional value, the method of gear detection mentioned for a manually-shifted transmission is ruled out. Thus, with a fixed step-up G of the transmission 103, quotients Nmot/Vrad are ascertained which may also occur in the case of gear stage decreased or increased by one. However, no quotients Nmot/Vrad occur which would be associated with a more remote gear stage.

In accordance with the invention, a fixed limiting quotient Sij (FIG. 2) is not used for each gear stage G, but two limiting quotients Sup and Sdown dependent upon the drive wheel velocity Vrad and the actual gear stage G are formed in each case for change-up and change-down.

Figure 3A:
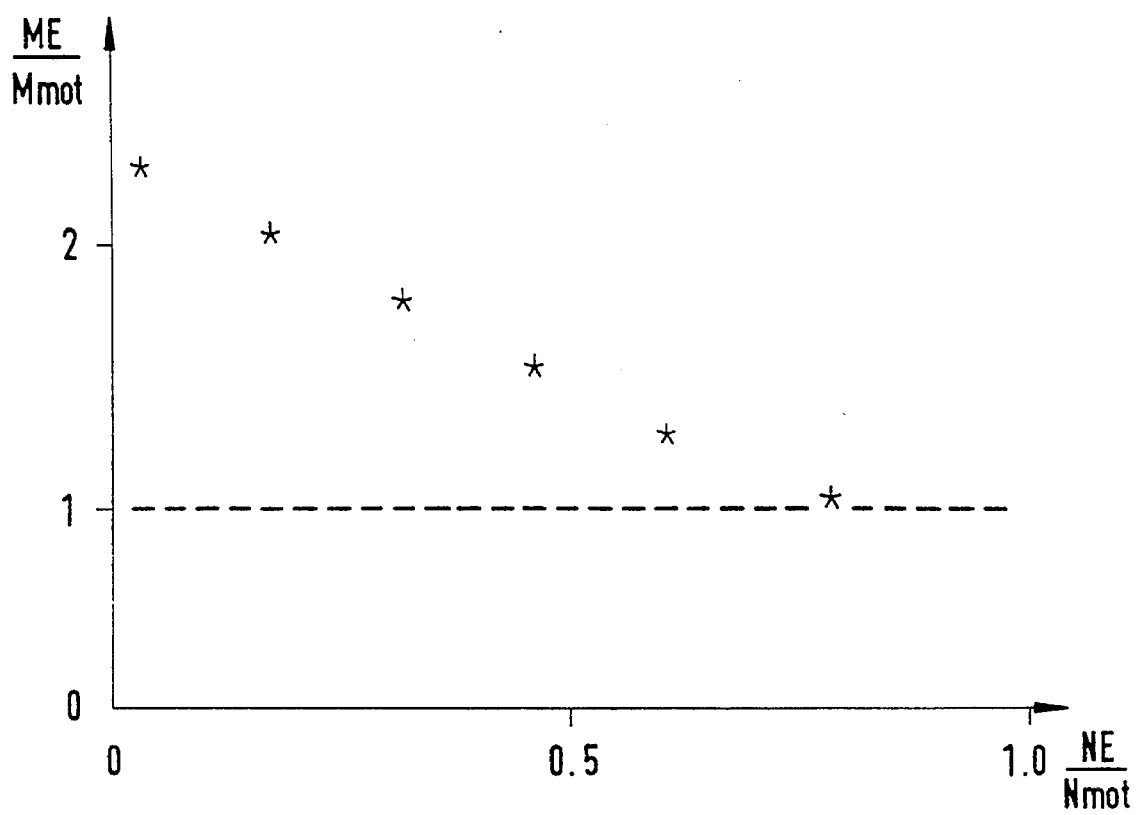
FIG. 3a shows the curve of the torque amplification of the converter plotted against the slip of the converter.
Figure 3B:
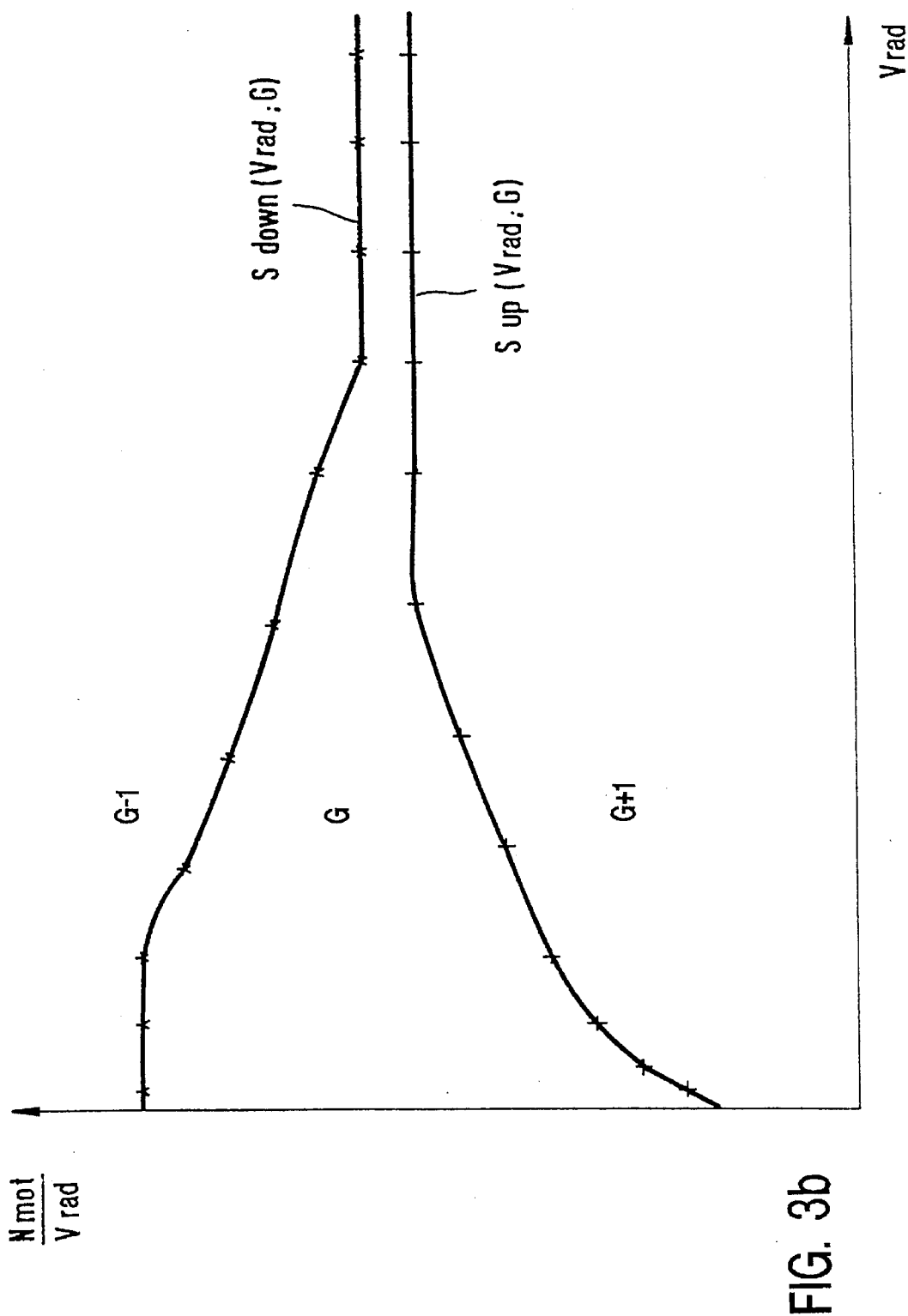
FIG. 3b shows two comparison thresholds.

These limiting quotients are plotted for an actual gear G in FIG. 3b against the mean wheel velocity Vrad. In this connection, the gear stage G−1 (change-down operation) is detected when the limiting line Sdown is exceeded, if the gear stage G had previously been set. The gear stage G+1 (change-up operation) is detected when the limiting line Sup is passed in a negative direction, if the gear stage G had previously been set. It will be appreciated that the transmission output rotational speed Nab may be chosen instead of the mean wheel velocity Vrad.

This method will now be further described with reference to the flow diagram of FIG. 4.

The variable G, representing the instantaneously engaged transmission step-up, is set to the value zero in the initialization step 42. The signals Nmot and Vrad representing the engine speed and the mean wheel velocity are read in in step 43. The quotient Nmot/Vrad are formed in the next step 44 in order to read out the upper and lower thresholds Sup and Sdown from a characteristic in accordance with FIG. 3b. As already described, these thresholds are dependent upon the gear actually engaged. This gear is represented by the value G and, in this example, is, as mentioned, initialized with G=0 in the first pass. The ratio Nmot/Vrad formed in step 44 is then compared with the thresholds Sup and Sdown in the comparison steps 46 and 47. If the quotient Nmot/Vrad drops below the threshold Sup, the value G representing the gear setting is increased by one in step 49. In this case, a change-up operation has been detected. If it is established in step 47 that the quotient Nmot/Vrad exceeds the second threshold Sdown, the value G is reduced by one in step 48. In this case, a change-down operation has been detected.

The sequence shown in FIG. 4 is run through time after time during operation of the vehicle with the value G actualized in each case. The step-up of the transmission 103 actually set is thereby acquired by reading out the value G. At the same time, the value G lies between the value 0 (idling, for example) and the maximum step-up Gmax, and thus fulfills the condition 0</=G</=Gmax.

A fixed mechanical step-up Gi of the transmission 103 may then be associated with the individual gear stages. With knowledge of the transmission step-up Gi and the mean wheel velocity Vrad, the transmission input rotational speed NE may then be readily ascertained. The converter amplification $V_W$ may be ascertained as a quotient of the converter output torque ME and the engine torque Mmot from the ratio Nmot/NE (input/output rotational speed of the converter) with reference to an isolated characteristic (in FIG. 3a).

Figure 5:
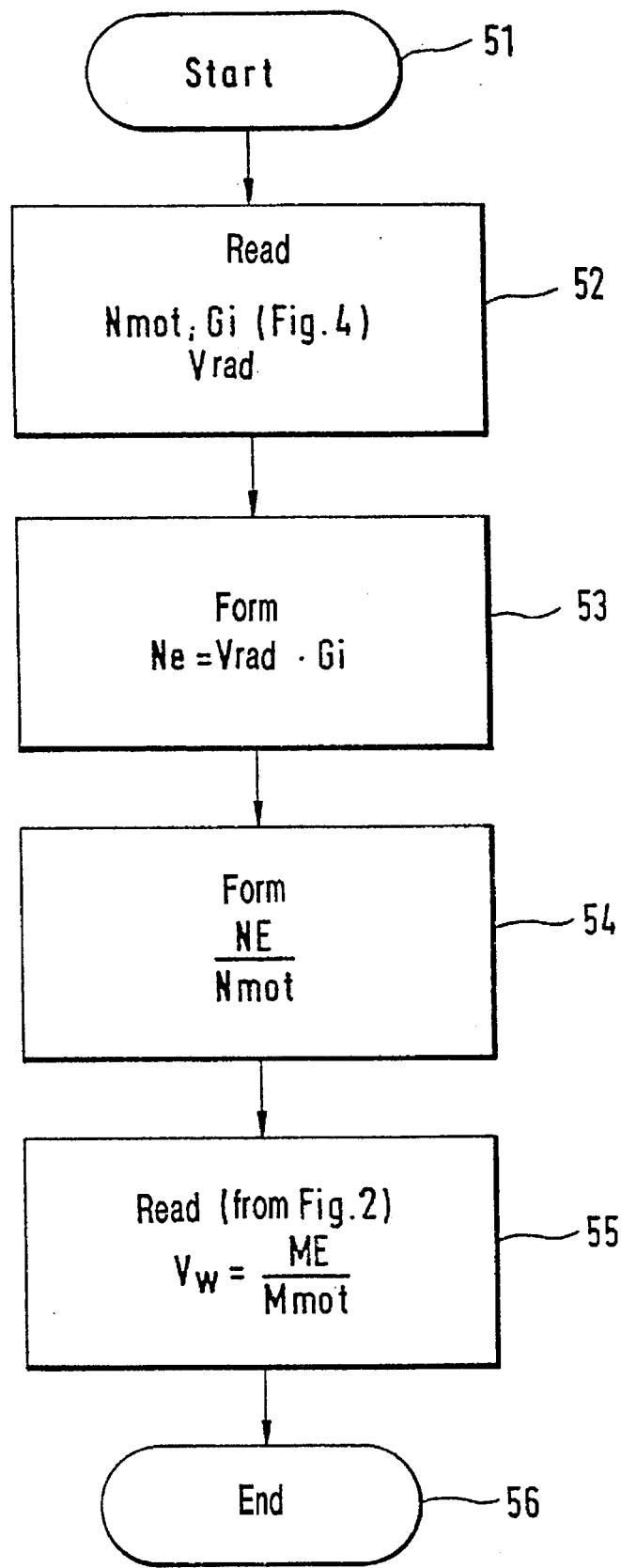

A flow diagram of this method is shown in FIG. 5. After the starting step 51, the engine speed Nmot, the mean wheel velocity Vrad and the instantaneous step-up Gi of the transmission are read-in in step 52. The instantaneous step-up of the transmission is at the same determined in accordance with FIG. 4. The transmission input rotational speed NE is then formed in step 53 by multiplicative combination of the mean wheel velocity with the actual transmission step-up. Furthermore, the quotient NE/Nmot (transmission input rotational speed/engine speed) is formed in step 54. The torque converter amplification $V_w$, which indicates the ratio of the transmission input torque ME to the engine torque Mmot, may then be ascertained in step 55 with reference to converter characteristics (FIG. 3a). The sequence shown in FIG. 5 may be run through again after the final step 56.

The knowledge of the converter amplification $V_W$ is of great importance for drive slip control, since the torque amplification of the entire engine/converter/transmission/differential train is determinable therefrom.

In a particularly simple embodiment of the invention, the limiting lines shown in FIG. 3b are used only for a change between the first and second transmission gears. Furthermore, fixed limiting quotients are used for the other gear stages, as in a manually-shifted transmission.

What is claimed is:

1. Method for controlling torque in a motor vehicle having an engine, a torque converter, an automatic transmission, and at least one driven wheel, said method comprising determining the mean wheel velocity Vrad of said at least one driven wheel, determining the output rotational speed Nmot of the engine, forming the ratio Nmot/Vrad of the output rotational speed to the mean wheel velocity, comparing said ratio Nmot/Vrad with at least two threshold values Sup, Sdown, determining a gear stage change of the transmission based on said comparison, determining the engaged gear stage Gi based on said change and the gear stage engaged before said comparison, and controlling the drive wheel torque using said engaged gear stage Gi.

2. Method as in claim 1 wherein said threshold values Sup, Sdown are dependent on the gear stage engaged before said comparison.

3. Method as in claim 2 wherein, based on the gear stage engaged before the comparison, a change-down in gear stage is detected when Nmot/Vrad passes Sdown in a positive direction, and a change-up is detected when Nmot/Vrad passes Sup in a negative direction.

4. Method as in claim 3 wherein, upon detection of a change-up in gear stage, the gear stage engaged before the comparison is increased by one.

5. Method as in claim 1 further comprising determining an actual amplification $V_w$ of said torque converter based on said engaged gear stage Gi, the mean wheel velocity Vrad and the engine speed Nmot, said drive wheel torque being influenced using said amplification $V_w$.

6. Method as in claim 5 wherein said actual amplification $V_w$ of said converter is determined by determining the output rotational speed NE of said torque converter based on Vrad and Gi, determining the ratio NE/Nmot, and determining the amplification $V_w$ based on the ratio NE/Nmot.

7. Apparatus for controlling drive wheel torque in a motor vehicle having an engine, a torque converter, an automatic transmission, and at least one driven wheel, means for determining means wheel velocity Vrad of the driven wheel, means for determining the output rotational speed Nmot of the engine, means for forming the ratio Nmot/Vrad, means for comparing said ratio Nmot/Vrad with at least two threshold values Sup, Sdown, means for determining the engaged gear stage Gi based on said comparison and the gear stage engaged before the comparison, and means for controlling influencing the drive wheel torque using said engaged gear stage Gi.

8. Apparatus as in claim 7 further comprising means for determining an actual amplification $V_w$ of said torque converter based on said engaged gear stage Gi, the mean wheel velocity Vrad, and the engine speed Nmot, said means for influencing the drive wheel torque using said amplification $V_w$ to control the drive wheel torque.

9. Method as in claim 3 wherein, upon detection of a change-down in gear stage, the gear stage engaged before the comparison is reduced by one.

* * * * *

UNITED STATES PATENT AND TRADEMARK OFFICE
CERTIFICATE OF CORRECTION

PATENT NO : 5,562,569
DATED : October 8, 1996
INVENTOR(S): Franzke et al.

It is certified that error appears in the above-identified patent and that said Letters Patent is hereby corrected as shown below:

In Claim 7, column 6, line 29, before "wheel" change "means" to --mean--.

In Claim 7, column 6, line 41, after "controlling" delete "influencing".

Signed and Sealed this

Twenty-ninth Day of June, 1999

*Attest:*

Q. TODD DICKINSON

*Attesting Officer*       *Acting Commissioner of Patents and Trademarks*